US008725521B2

(12) United States Patent
Whitmore (10) Patent No.: US 8,725,521 B2
(45) Date of Patent: May 13, 2014

(54) SYSTEM AND METHOD FOR DESIGNING SECURE BUSINESS SOLUTIONS USING PATTERNS (75) Inventor: James J. Whitmore, Carlisle, PA (US)

(73) Assignee: International Business Machines Corporation, Armonk, NY (US)

(*) Notice: Subject to any disclaimer, the term of this patent is extended or adjusted under 35 U.S.C. 154(b) by 2516 days.

(21) Appl. No.: 10/918,239

(22) Filed: Aug. 13, 2004

(65) Prior Publication Data

US 2006/0036479 A1 Feb. 16, 2006

(51) Int. Cl.
G06Q 10/00 (2012.01)
(52) U.S. Cl.
USPC ............ 705/1.1; 705/300; 705/301; 705/346; 705/348
(58) Field of Classification Search
None
See application file for complete search history.

(56) References Cited

U.S. PATENT DOCUMENTS

| 5,421,006 | A | 5/1995 | Jablon et al. |
| 5,519,778 | A | 5/1996 | Leighton et al. |
| 5,666,493 | A | 9/1997 | Wojcik et al. |
| 5,819,267 | A | 10/1998 | Uyama |
| 5,870,719 | A | 2/1999 | Maritzen et al. |
| 5,940,817 | A | 8/1999 | Kishi et al. |
| 5,968,110 | A | 10/1999 | Westrope et al. |
| 5,968,176 | A | 10/1999 | Nessett et al. |
| 6,035,399 | A | 3/2000 | Klemba et al. |
| 6,115,690 | A | 9/2000 | Wong |
| 6,233,537 | B1 | 5/2001 | Gryphon et al. |
| 6,385,609 | B1 | 5/2002 | Barshefsky et al. |
| 6,405,364 | B1 | 6/2002 | Bowman-Amuah |
| 6,671,809 | B1 | 12/2003 | Perona et al. |
| 6,993,743 | B2* | 1/2006 | Crupi et al. ................... 717/102 |
| 7,162,427 | B1* | 1/2007 | Myrick et al. ..................... 705/1 |
| 7,206,751 | B2 | 4/2007 | Hack et al. |
| 7,213,227 | B2* | 5/2007 | Kompalli et al. ............. 717/108 |
| 7,225,425 | B2* | 5/2007 | Kompalli et al. ............. 717/108 |
| 7,257,818 | B2* | 8/2007 | Foerg et al. ................... 719/310 |
| 7,289,989 | B2* | 10/2007 | Bou-Ghannam et al. ......... 707/6 |
| 2001/0018746 | A1 | 8/2001 | Lin |
| 2001/0032092 | A1 | 10/2001 | Calver |
| 2002/0073396 | A1* | 6/2002 | Crupi et al. ................... 717/104 |
| 2002/0093980 | A1* | 7/2002 | Trebes, Jr. ..................... 370/466 |
| 2002/0144106 | A1 | 10/2002 | Enomoto |
| 2002/0157015 | A1 | 10/2002 | Gilbert et al. |
| 2003/0040920 | A1* | 2/2003 | Adams et al. ..................... 705/1 |
| 2003/0154401 | A1* | 8/2003 | Hartman et al. ............... 713/201 |
| 2004/0044729 | A1* | 3/2004 | Foerg et al. ................... 709/203 |
| 2004/0044987 | A1* | 3/2004 | Kompalli et al. ............. 717/100 |

(Continued)

OTHER PUBLICATIONS

/www-106.ibm.com/developerworks/patterns/ as retrieved from the "wayback machine" as published Feb. 2002 (Patterns).*

(Continued)

Primary Examiner — Matthew L. Brooks
(74) Attorney, Agent, or Firm — Douglas A. Lashmit; Hoffman Warnick LLC (57) ABSTRACT A system and method for generating an information technology solution. A system for generating a runtime model is provided, comprising: a system for selecting a business pattern; a system for providing a management integration table, wherein the management integration table includes a plurality of cells, each representing at least one management application pattern; and a system for generating a runtime model from the selected business pattern and management integration table, wherein the generating system supplements the business pattern with additive patterns, bridge patterns, and management application patterns in order to generate the runtime model.

18 Claims, 11 Drawing Sheets

(56) References Cited

U.S. PATENT DOCUMENTS

| | | | |
|---|---|---|---|
| 2004/0143470 A1* | 7/2004 | Myrick et al. | 705/7 |
| 2005/0027870 A1* | 2/2005 | Trebes, Jr. | 709/227 |
| 2005/0071362 A1* | 3/2005 | Nelson et al. | 707/102 |
| 2005/0096937 A1* | 5/2005 | Subash et al. | 705/1 |
| 2005/0154976 A1* | 7/2005 | Nelson | 715/513 |
| 2005/0268232 A1* | 12/2005 | Stienhans et al. | 715/700 |
| 2006/0085747 A1* | 4/2006 | Morgan | 715/700 |
| 2006/0173893 A1* | 8/2006 | Kristoffersen et al. | 707/102 |
| 2006/0173894 A1* | 8/2006 | Kristoffersen et al. | 707/102 |
| 2007/0288275 A1* | 12/2007 | Kumar | 705/7 |
| 2008/0163162 A1* | 7/2008 | Shaburov et al. | 717/105 |
| 2009/0171720 A1* | 7/2009 | Crook et al. | 705/7 |

OTHER PUBLICATIONS

/www-106.ibm.com/developerworks/patterns/ as retrieved from the "wayback machine" as published Feb. 2002 (Patterns). pp. 7-9.*

"Research and Markets Ltd: Web Services Market Opportunities, Strategies, and Forecasts"; M2 Presswrie, COventry: Nov. 13, 2002.*

/www-106.ibm.com/developerworks/patterns/ as retrieved from the "wayback machine" as published Feb. 2002 (Patterns A-Q).*

Sailer, R., "A User-Focused Security Service Architecture for Communication Networks," AEU-International Journal of Electronics and Communications, vol. 55, No. 1, 2001, pp. 72-80.

Sherwood, J., "SALSA: A Method for Developing the Enterprise Security Architecture and Strategy," Elsevier Science Ltd., 1996, pp. 501-506.

Adams, U.S. Appl. No. 09/925,259, Notice of Allowance & Fees Due, Mar. 14, 2008, 6 pages.

Adams, U.S. Appl. No. 09/925,259, Office Action Communication, Jun. 13, 2007, 12 pages.

Adams, U.S. Appl. No. 09/925,259, Office Action Communication, Apr. 18, 2006, 15 pages.

Adams, U.S. Appl. No. 09/925,259, Office Action Communication, Sep. 29, 2005, 14 pages.

Gilbert, U.S. Appl. No. 09/838,749, Notice of Allowance & Fees Due, Apr. 5, 2007, 11 pages.

Gilbert, U.S. Appl. No. 09/838,749, Office Action Communication, Feb. 9, 2006, 12 pages.

Gilbert, U.S. Appl. No. 09/838,749, Office Action Communication, Jul. 13, 2005, 12 pages.

Gilbert, U.S. Appl. No. 09/838,749, Office Action Communication, Oct. 21, 2004, 9 pages.

Whitmore, "Security and e-business: is there a prescription?", 21st National Information Systems Security Conference 1998, Paper Submission, 9 pages.

Stephens, "Supply Chain Council & Supply Chain Operations Reference (SCOR) Model Overview", Nov. 1998, 31 pages.

Verton, "Common ground sought on IT security requirements", Computerworkd, Mar. 21, 2001, 2 pages.

* cited by examiner

Mapping Contexts to Management application patterns

| Context | Provision | Control | Monitor | Enforce | Protect |
|---|---|---|---|---|---|
| Business System | Business Processes (BPs)<br>BP Policies<br>BP Rules<br>BP Objects<br>BP Users<br>BP Assets | Process flow<br>Workflow<br>Work input<br>Work output | State<br>Metrics<br>Events<br>Conditions | Policies<br>Rules<br>Agreements | Objects<br>Assets |
| Information Technology System | System configuration<br>Network configuration<br>MW configuration<br>App configuration<br>Security configuration | Administration<br>Operation<br>Utilization<br>Performance<br>Diagnosis<br>Recovery | State<br>Metrics<br>Events<br>Conditions | Policies<br>Rules<br>Service Levels<br>Availability<br>Continuity | IT Environment<br>IT Infrastructure<br>IT Resources<br>IT Components<br>IT Processes<br>IT Flows |
| Data System | Repositories<br>Dataspaces<br>Schema; Tables<br>Business Objectspaces<br>Info System Objectspaces<br>Security Objectspaces | Administration<br>Operation<br>Utilization<br>Performance<br>Diagnosis<br>Recovery | State<br>Metrics<br>Events<br>Conditions | Policies<br>Rules<br>Service Levels<br>Availability<br>Currency | Repositories<br>Instances<br>Objects |
| Security System | Security Policies<br>Security Objects<br>Security Attributes<br>Security Protection Zones | Security policy administration<br>Security Event management | State<br>Metrics<br>Events<br>Conditions | Access Policies<br>Flow Policies<br>Identity Policies<br>Privacy Policies | Security Zones<br>Security Components<br>Security Objects<br>Security Flows |

SYSTEM AND METHOD FOR DESIGNING SECURE BUSINESS SOLUTIONS USING PATTERNS

BACKGROUND OF THE INVENTION

1. Technical Field

The present invention relates generally to designing information technology (IT) solutions, and more specifically to a system and method for designing secure IT solutions using patterns.

2. Related Art

The repeatable practice of designing and integrating information technology (IT) solutions that satisfy the totality of business and security requirements, i.e., correct and reliable operation, has several inhibitors. These inhibitors include: (1) the organizational challenge of enumerating the totality of security and business requirements; (2) the analytical challenge of combining, organizing and articulating the resulting solution approach in a coherent manner; and (3) the technical challenge of designing, integrating and validating the information technology solution using prevailing technologies and components.

Patterns-based design seeks to reduce the variability in the analytical and technical challenges in the design process by leveraging artifacts as design models. While there are contemporary approaches for information technology solution design using patterns, these approaches tend to consider topology, i.e., network topology, etc. Using contemporary topology artifacts for patterns-based design for security has drawbacks because while these models represent current practice, they do not necessarily represent the best possible practice.

A design model that focuses strictly on a given business context is at risk of missing the security concerns that are independent of the business view, and conversely, a design model that is independent of business context is at risk of missing the security concerns that are specific to a business. Published catalogs, such as Patterns for e-Business provide design models that support a range of business contexts. There is a need for similar models that reflect both the business-related and information technology related aspects of security.

U.S. patent application Publication No.: US2002/0157015, "Method and Systems for Designing a Secure Solution" describes a method for systematically applying a totality of security requirements as defined in International Standard ISO 15408. U.S. patent application Publication No.: 2003/0040920, "Architecture designing method and system for e-business solutions," describes a method for systematically designing solutions based upon business requirements, using patterns. Both references are hereby incorporated by reference.

Unfortunately, the above references do not teach a comprehensive approach to architecting a secure solution using patterns. Accordingly, a system is needed for designing secure IT solutions.

SUMMARY OF THE INVENTION

The present invention addresses the above-mentioned problems, as well as others, by providing a system and method for architecting a secure IT solution using patterns. In a first aspect, the invention provides a system for generating an information technology solution, comprising: a system for selecting a business pattern; a system for providing a management integration table, wherein the management integration table includes a plurality of cells, each representing at least one management application pattern; and a system for generating a runtime model from the selected business pattern and management integration table, wherein the generating system supplements the business pattern with additive patterns, bridge patterns, and management application patterns in order to generate the runtime model.

In a second aspect, the invention provides a program product stored on a recordable medium for generating an information technology runtime model, comprising: means for selecting a business pattern; means for providing a management integration table, wherein the management integration table includes a plurality of cells, each representing at least one management application pattern; and means for generating a runtime model from the selected business pattern and management integration table, wherein the generating means supplements the business pattern with additive patterns, bridge patterns, and management application patterns in order to generate the runtime model.

In a third aspect, the invention provides a method for generating an information technology runtime model, comprising: selecting a business pattern; providing a management integration table, wherein the management integration table includes a plurality of cells, each representing at least one management application pattern; and generating a runtime model from the selected business pattern and management integration table, wherein the generating step supplements the business pattern with additive patterns, bridge patterns, and management application patterns in order to generate the runtime model.

In a fourth aspect, the invention provides a method for generating an information technology runtime model, comprising: selecting a business pattern; selecting a management integration pattern for the business pattern; selecting an application pattern associated with the business pattern; selecting a base runtime pattern; adding security enforce and security protect additive patterns to the base runtime pattern; adding security and information technology monitor and control additive patterns; adding management application patterns; adding provision bridge patterns for security data; and adding provision, monitor, control, enforce and protect patterns for data.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Business patterns highlight the most commonly observed interactions between users, businesses, and data. They are the fundamental building blocks of most e-business solutions, and describe the interaction between the participants in an e-business solution. Complex e-business applications can be built by combining multiple business patterns together. This is accomplished by using integration patterns as the "glue" between business patterns. Integration patterns are differentiated from business patterns in that they do not themselves automate specific business processes. Rather, they are used within business patterns to support more advanced functions, or to make composite patterns feasible by allowing the integration of two or more business patterns. Composite patterns combine business patterns and integration patterns to create complex, advanced e-business applications.

Figure 1:
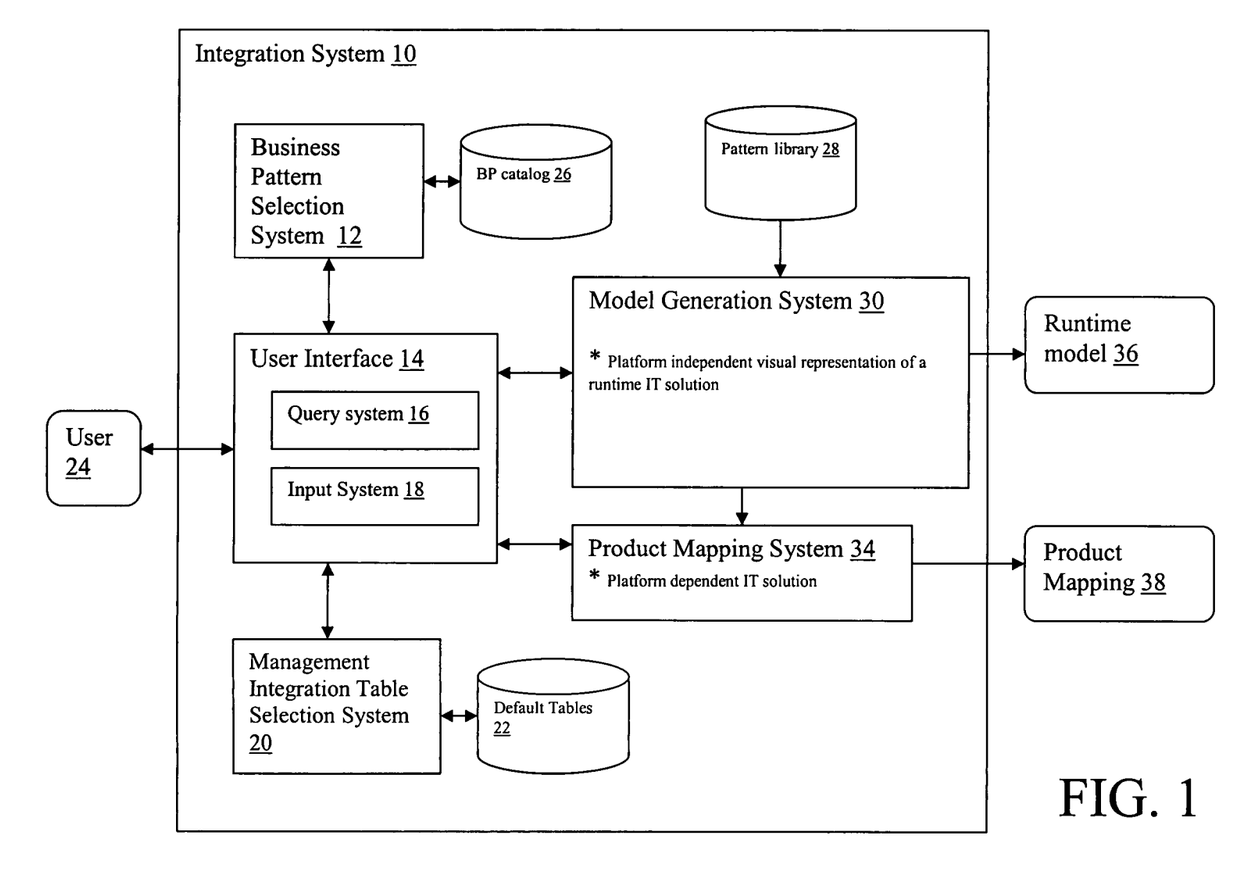
FIG. 1 depicts an integration system for generating a runtime model in accordance with the present invention.

In a typical application design process, a design model of an information technology (IT) solution is first generated that provides a visual picture of the processes involved in the application. FIG. 1 depicts an integration system 10 for building a runtime model 36 that integrates business patterns with integration patterns to provide a comprehensive solution that meets both the business and security objectives of the desired solution. In the illustrative embodiment described in FIG. 1, a user interface 14 is provided that allows a user 24 to select both a business pattern and a management integration table that will be utilized by model generation system 30 as input for building the runtime model 36. Also provided is a product mapping system 34 that converts the runtime model 36 into a set of required products, or product mapping 38, necessary to implement the solution.

It should be appreciated that integration system 10 of the present invention could be carried out on a stand-alone computer system, or over a network such as the Internet, a local area network (LAN), a wide area network (WAN), a virtual private network (VPN), etc. In the case of the latter, user 24 could communicate with the computer system using another computerized device. Suitable computer systems may include a desktop computer, a laptop computer, a workstation, a hand held device, a client, a server, etc. In any event, the computer system may generally comprise, e.g., a processing unit, memory, a bus, input/output (I/O) interfaces, external devices/resources and a storage unit. The processing unit may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, similar to processing unit, memory may reside at a single physical location, comprising one or more types of data storage, or be distributed across a plurality of physical systems in various forms.

I/O interfaces may comprise any system for exchanging information to/from an external source. External devices/resources may comprise any known type of external device, including speakers, a CRT, LED screen, hand-held device, keyboard, mouse, voice recognition system, speech output system, printer, monitor/display, facsimile, pager, etc.

A storage unit can be any system (e.g., a database) capable of providing storage for information under the present invention. Such information could include, among other things, stored patterns. As such, the storage unit could include one or more storage devices, such as a magnetic disk drive or an optical disk drive. In another embodiment, the storage unit may include data distributed across, for example, a local area network (LAN), wide area network (WAN) or a storage area network (SAN).

Figure 2:
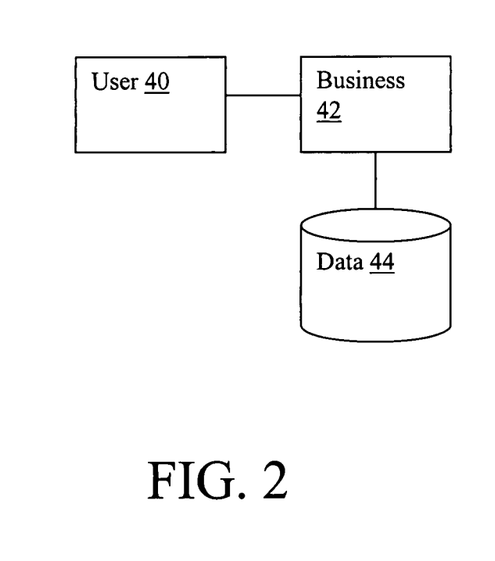
FIG. 2 depicts a business pattern in accordance with the present invention.

Integration system 10 includes a business pattern selection system 12 that accesses a business pattern catalog 26 or database. A simple business pattern is shown in FIG. 2 which generally describes a business 42 that provides data 44 to an end user 40. Such a pattern is for example common for businesses that provide data over the web to their customers. Obviously, much more complex business patterns exist, and examples of such patterns are provided by IBM™. For example, an overview of such business patterns, as well as other types of patterns can be found at <www-106.ibm.com/developerworks/patterns>.

Figure 3:
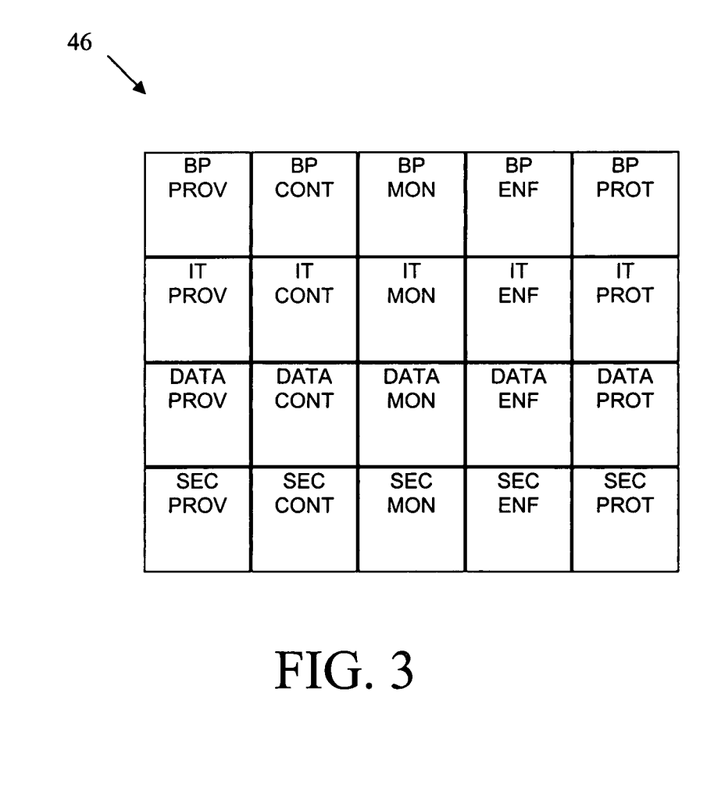
FIG. 3 depicts a management integration table in accordance with the present invention.
Figure 5:
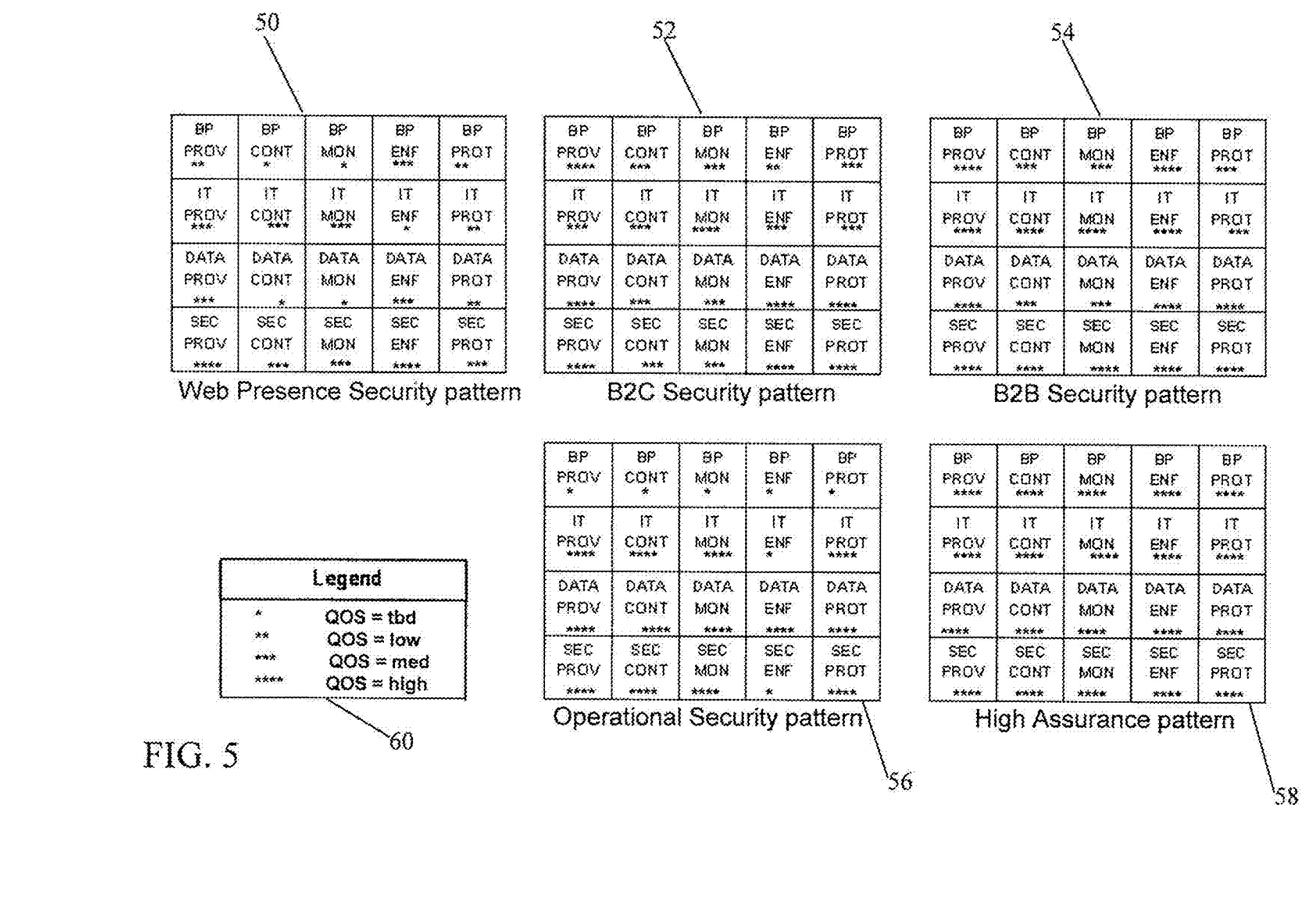
FIG. 5 depicts a set of default management integration tables.

Integration system 10 also includes a management integration table selection system 20 that allows a user to select a management integration table from amongst a set of default tables 22, or input their own table via input system 18. An example of a management integration table 46 is shown in FIG. 3, and a set of management integration tables 50, 52, 54, 56, 58 are shown in FIG. 5. Each entry, or cell, in the management integration table 46 represents the existence of one or more management application patterns that must be considered when building the runtime model 36. Management application patterns provide patterns of objects and flows related to management processes.

In this illustrative embodiment, there are five management application pattern types (shown along the horizontal axis) that must be considered for four system contexts (shown along the vertical axis). The five management application pattern types include:

| | |
|---|---|
| Provision: | creation and maintenance of instances of objects (PROV). |
| Control: | bi-directional communication between a control point and a process object for the purpose of affecting the behavior of the process object (CONT). |
| Monitor: | acquisition and recording of information about an event, condition or process, with the potential to analyze the information, make informed decisions about the state of or impact on the process, and provide input to control actions (MON). |
| Enforce: | manipulation of the execution of flows and actions within a process based on policies (ENF). |
| Protect: | the ability to maintain the state, the location, synchronization and/or the integrity of objects (PROT). |

These pattern types are each considered in the following four system contexts:

| | |
|---|---|
| Business System: | one or more business processes with associated assets (BP). |
| IT System: | collections of processes and technology components associated with the operation of computing systems (IT). |
| Data System: | collections of processes and objects within a computing system associated with movement and storage of data (DATA). |

-continued

| | |
|---|---|
| Security System: | collections of processes and objects associated with implementing policy and managing risks (SEC). |

Figure 4:
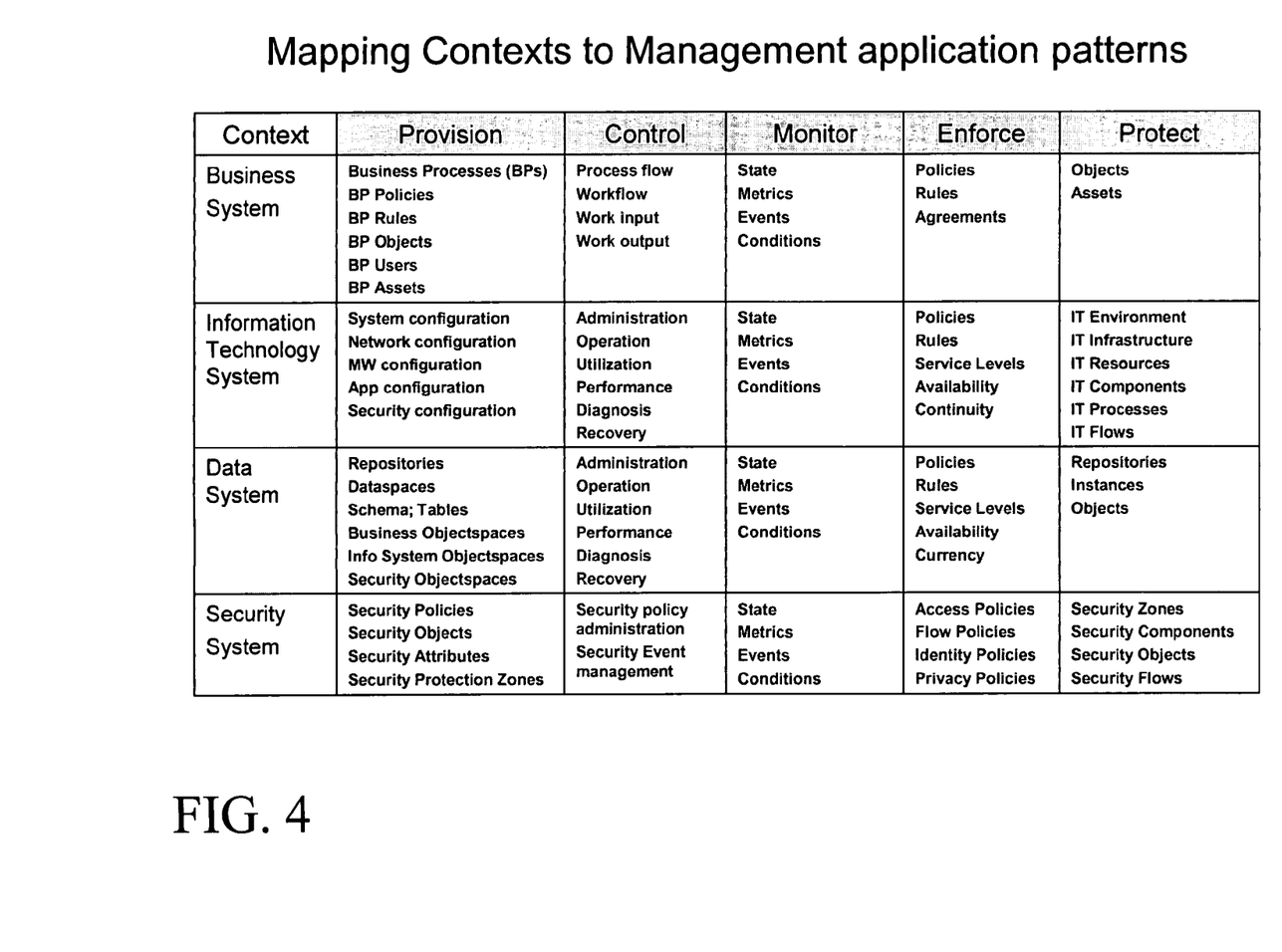
FIG. 4 depicts a table of four system contexts being mapped to five management application patterns.

FIG. 4 depicts a table of the four system contexts being mapped to the management application patterns. Each entry represents an illustrative set of functions, flows or features that must be considered for building management application patterns.

FIG. 5 depicts an illustrative set of tables 50, 52, 54, 56, 58 in which different entries are given different security priorities. In particular, the entries are rated as either high, medium, low or to be done ("tbd"), as shown in the legend 60. Because the amount of security and management will depend on the particular intended use of a given business pattern, the relative security importance of a particular entry can differ. For instance, the business pattern shown in FIG. 2 may be used by a bank to provide sensitive account information to their clients, or be used by a web server to provide general content, such as news. Depending on the particular circumstances, the user 24 can select or provide the table that best meets the requirements of the application being developed. The examples shown in FIG. 5 include a web presence security pattern 50, a B2C (business-to-customer) security pattern 52, a B2B (business-to-business) security pattern 54, an operation security pattern 56 and a high assurance pattern 58. Obviously, other patterns could be utilized. Query system 16 may be utilized to help select a business pattern and management integration table by asking questions of the user 24 to identify what the security and business requirements are for the user's application.

Figure 6:
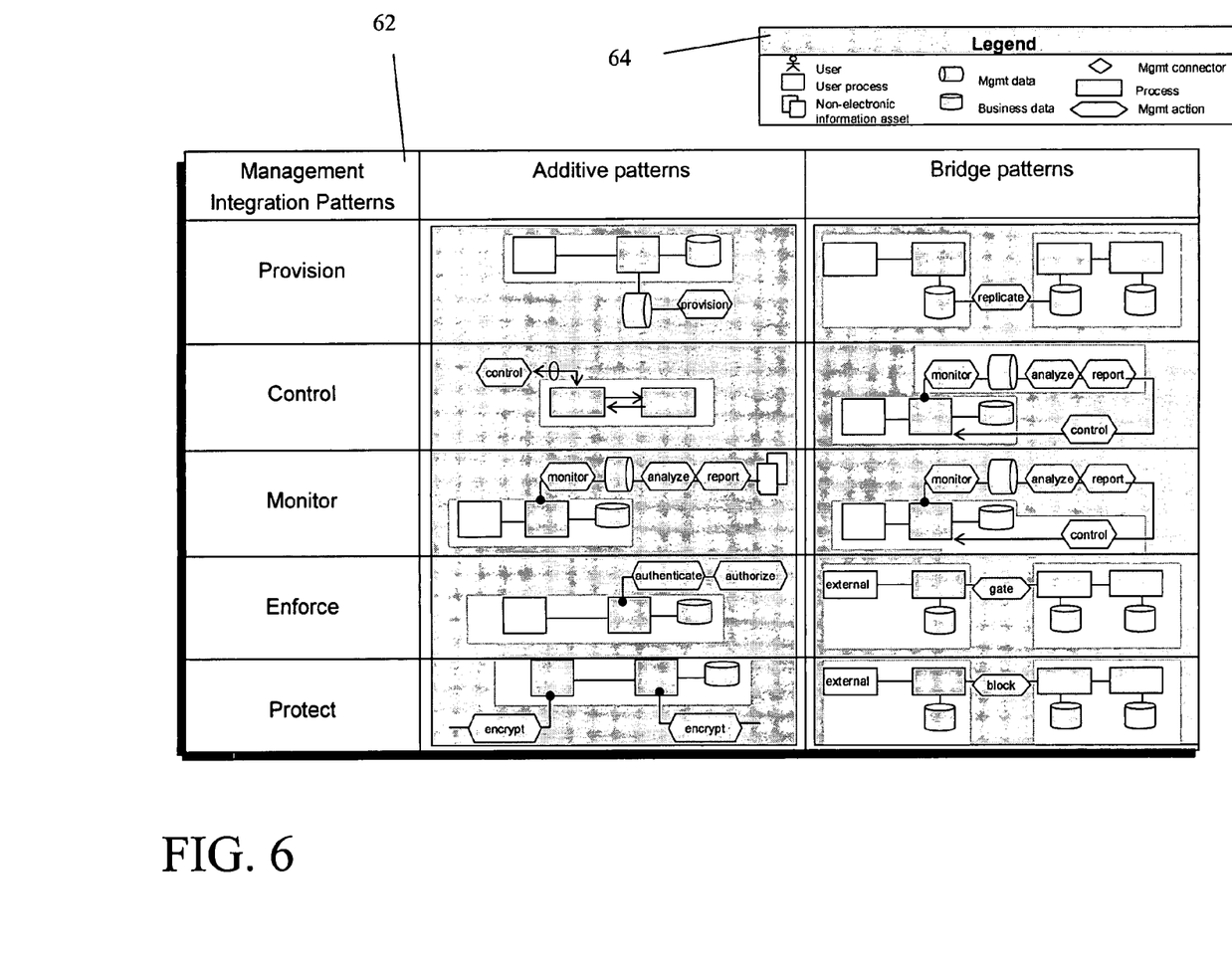
FIG. 6 depicts a representative set of management integration patterns.

After a business pattern and a management integration table have been selected, model generation system 30 is utilized to build a runtime model 36 based on patterns selected from a pattern library 28. To accomplish this, two classes of patterns are utilized, management integration patterns and management application patterns. Management integration patterns are further broken down into two types, additive patterns and bridge patterns. FIG. 6 shows an illustrative set of management integration patterns 62 for each of the five management application pattern types. A legend 64 is provided that outlines the different actors and functions used by each pattern. Management integration patterns provide patterns of actions and augmented flows that integrate business processes and management processes within each of the five defined system contexts.

Additive patterns provide additional processes that must be added to the selected business pattern to achieve the desired objectives beyond the selected business pattern and management application patterns. Bridge patterns provide additional processes necessary to bridge different patterns.

Figure 7:
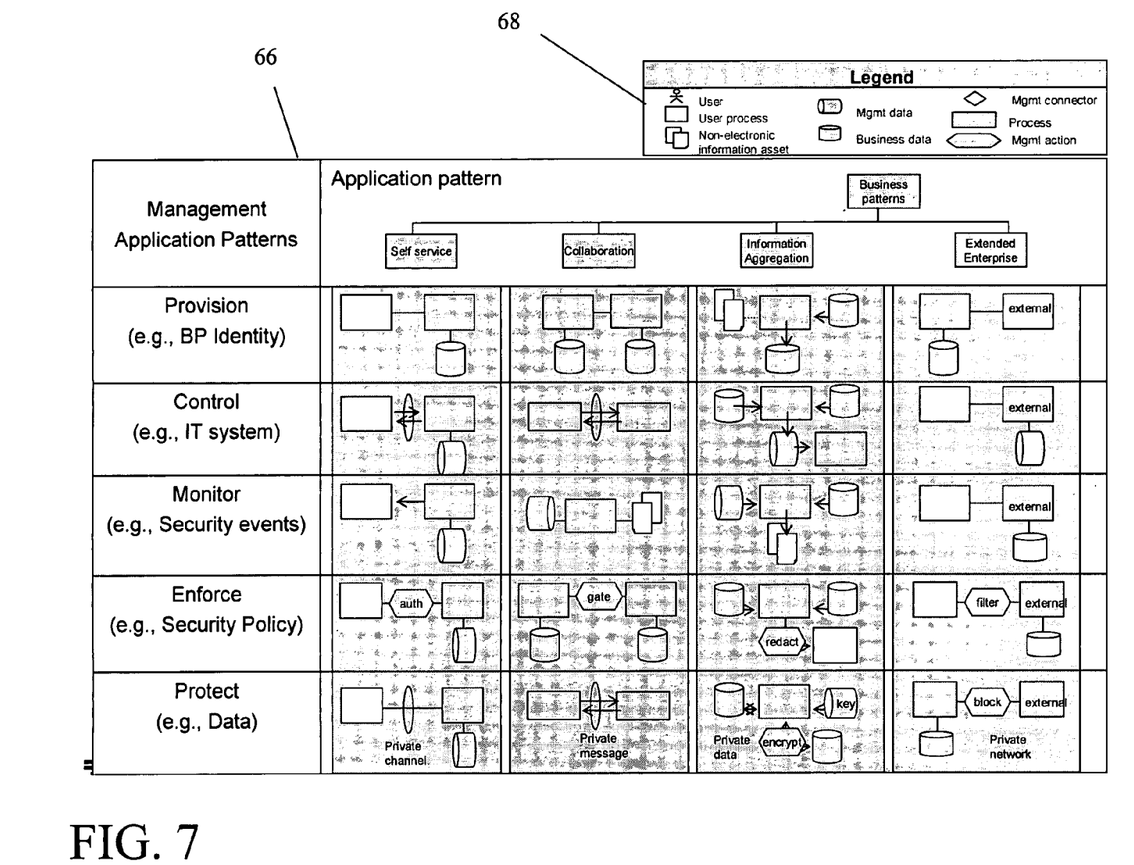
FIG. 7 depicts a representative set of management application patterns.

FIG. 7 depicts an illustrative set 66 of management application patterns for each of the five management application types. In this case, patterns are shown for self service processes, collaboration processes, information aggregation processes and extended enterprise processes. A legend 68 is provided that outlines the different actors and functions used by each pattern.

Figure 8:
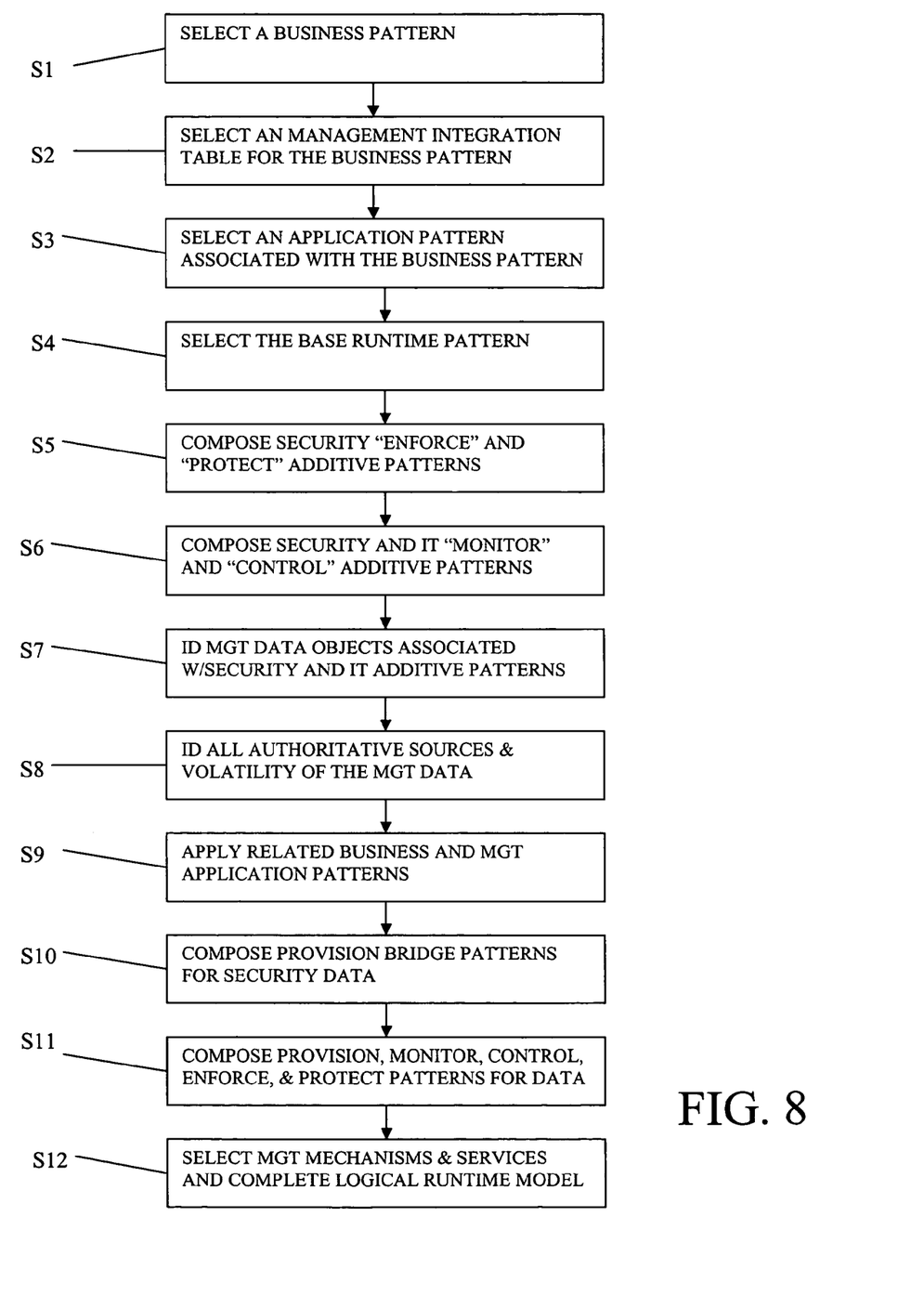
FIG. 8 depicts a flow diagram of a method of an embodiment of the present invention.
Figure 9:
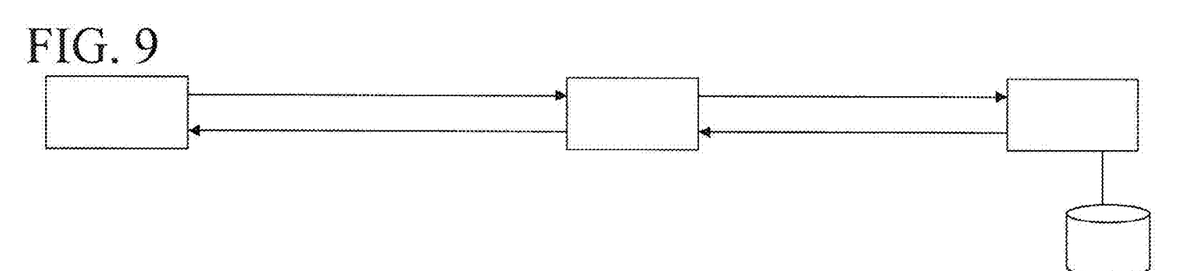
FIG. 9 depicts an application pattern in accordance with an embodiment of the present invention.
Figure 10:
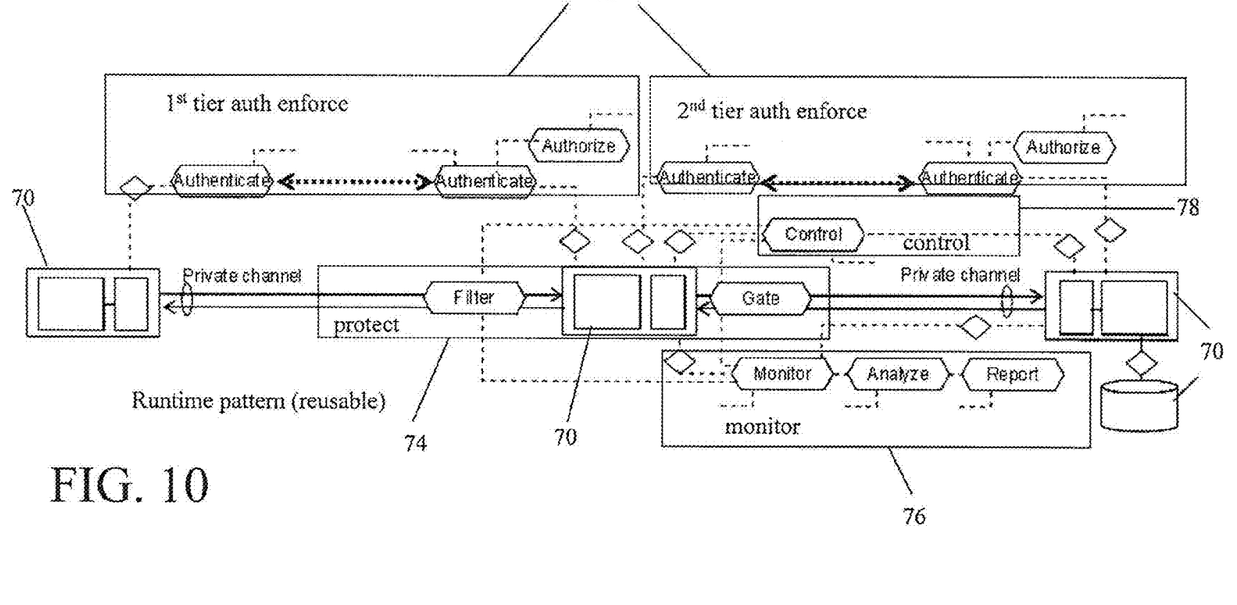
FIG. 10 depicts a partially completed runtime model in accordance with an embodiment of the present invention.

FIG. 8 depicts an illustrative flow diagram for a method of implementing the model generation system 30. Initially, a business pattern is selected at step S1, and a management integration table is selected at step S2. At step S3, and application pattern is selected that is associated with the business pattern. Application patterns represent the partitioning of the application logic and data together with the styles of interaction between the logic tiers. FIG. 9 depicts an application pattern associated with the business pattern shown in FIG. 2. Next, at step S4, a base runtime pattern 70 is selected, as shown in FIG. 10. Runtime patterns use nodes to group functional requirements. The nodes are interconnected to solve the business problem. Base runtime pattern 70 depicts a node that represents an instance of a computing function that contains other instances of computing functions (e.g., presentation and client processing vs. intermediate processing vs. application processing and database access). Next, at step S5, security enforce 72 and protect 74 additive patterns are composed and added to the base runtime pattern 70, shown in FIG. 10. At step S6, security and IT monitor 76 and control 78 additive patterns are composed and added to the base runtime pattern 70, shown in FIG. 10.

Figure 11:
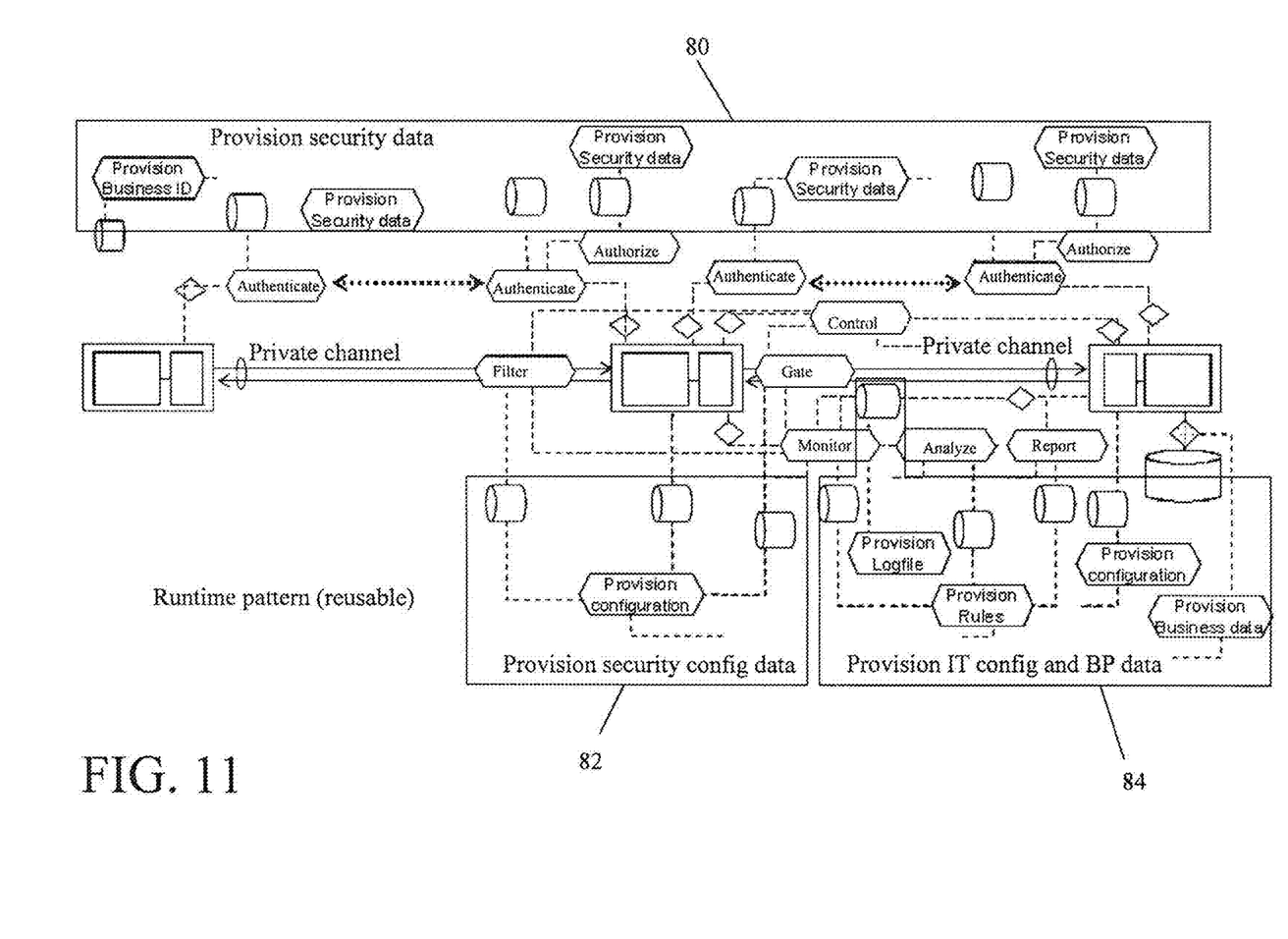
FIG. 11 depicts a partially completed runtime model in accordance with an embodiment of the present invention.

At steps S7, management data objects associated with security and IT additive patterns are identified. At step S8, all authoritative sources and volatility of management data are identified. These steps may involve the provisioning of security data 80, security configuration data 82, and IT configuration and business pattern data 84, as shown in FIG. 11.

Figure 12:
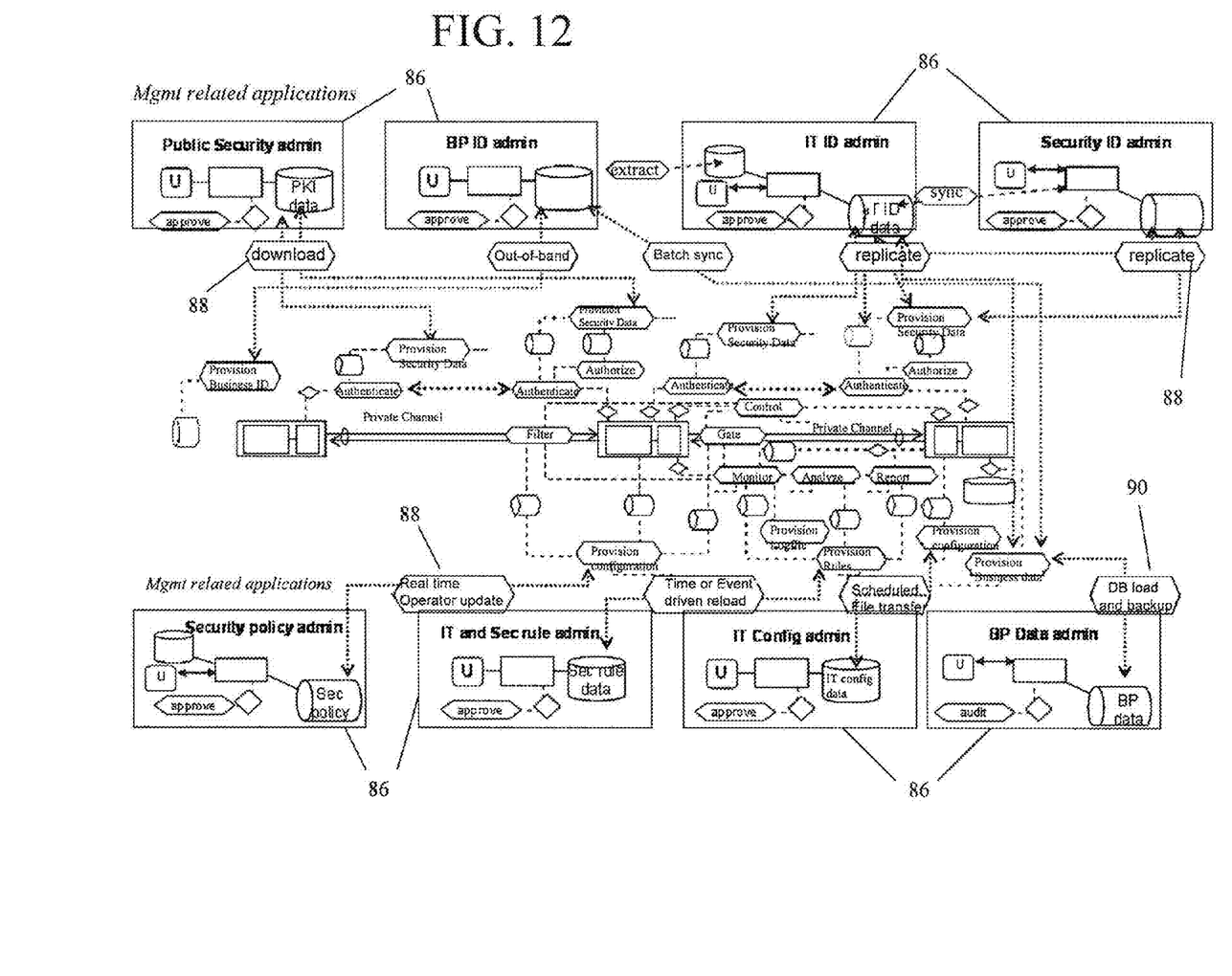
FIG. 12 depicts a partially completed runtime model in accordance with an embodiment of the present invention.

Next, at step S9, related business and management application patterns 86 are applied, as shown in FIG. 12. At step S10, provision bridge patterns 88 for security data are composed, and at step S11, provision, monitor, control, enforce and protect patterns 90 for data are composed, as shown in FIG. 12.

Finally, at step S12, management mechanism and services are selected and the logical runtime model is completed. This step might include querying for information, such as:
1. What are the desired provisioning and administration processes for:
   Business Processes (CRM, HR, etc.)
   Information Technology (System IDs, email IDs, application IDs etc)
   Security Authorizations (permissions and privileges for Systems and applications)
2. How is BP ID provisioning linked to IT ID provisioning and administration?
3. How is IT ID provisioning and administration linked to Security Authorization provisioning?
4. What is the volatility of the data used by management processes?
5. What factors were considered in selecting management protocols, mechanisms and services?
6. What is the residual volatility of management data and how does that relate to technical risk?

Figure 13:
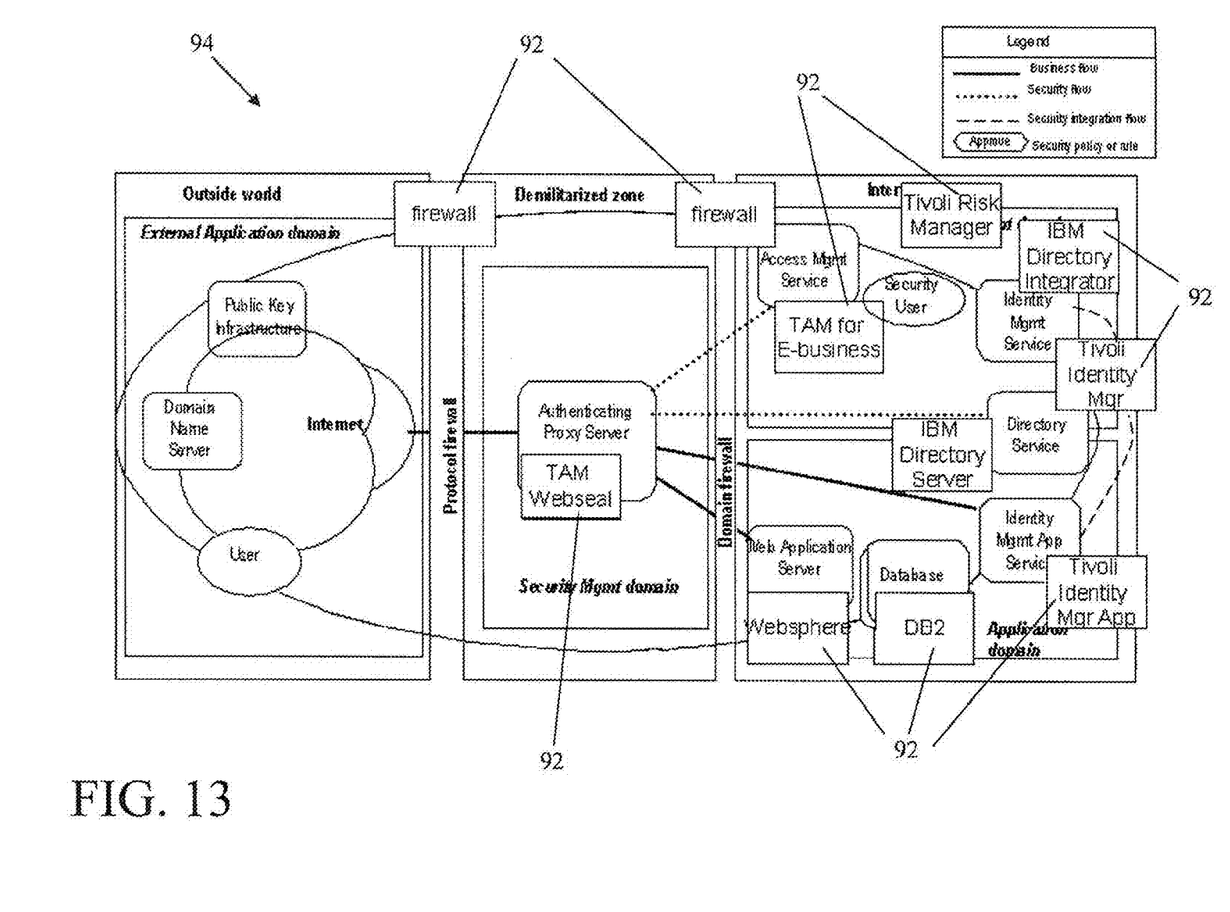
FIG. 13 depicts a product mapping in accordance with an embodiment of the present invention.

Based up the results of these queries, a higher level runtime model 94 can be constructed to which a product mapping 92 can be incorporated, such as that shown in FIG. 13.

It should be appreciated that the teachings of the present invention could be offered as a business method on a subscription or fee basis. For example, a computer system could be created, maintained, supported and/or deployed by a service provider that offers the functions described herein for customers.

It is understood that the systems, functions, mechanisms, methods, engines and modules described herein can be implemented in hardware, software, a propagated signal, or any combination thereof. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system, comprising:
at least one computing device for generating an information technology runtime model by performing a method comprising:
selecting a business pattern;
providing a management integration table for the business pattern, the management integration table including a first axis including a plurality of management application pattern types including provision, control, monitor, enforce, and protect, and a second axis including a plurality of system contexts including business process, information technology, data, and security, wherein the management integration table includes a plurality of cells, each cell representing at least one management application pattern for a corresponding combination of the management application pattern type and the system context; and
generating a runtime model from the business pattern and management integration table, wherein the generating supplements the business pattern with management application patterns selected using the management integration table, additive patterns required to achieve an objective beyond the business pattern and the management application patterns, and bridge patterns necessary to bridge two or more patterns in order to generate the runtime model.

2. The system of claim 1, wherein the business pattern is selected from a database of available business patterns.

3. The system of claim 1, wherein the plurality of cells within the management integration table are rated based on a relative security importance.

4. The system of claim 1, the method performed by the system further comprising generating a product mapping.

5. The system of claim 1, wherein the management application patterns provide patterns of objects and flows related to management processes.

6. The system of claim 1, wherein the additive and bridge patterns comprises management integration patterns that provide patterns of actions and augmented flows that integrate business processes and management processes with a set of defined system contexts.

7. A computer program comprising program code embodied on a computer-readable storage medium, which when executed, enables a computer system to implement a method of generating an information technology runtime model, the method comprising:
selecting a business pattern;
providing a management integration table for the business pattern, the management integration table including a first axis including a plurality of management application pattern types including provision, control, monitor, enforce, and protect, and a second axis including a plurality of system contexts including business process, information technology, data, and security, wherein the management integration table includes a plurality of cells, each cell representing at least one management application pattern for a corresponding combination of the management application pattern type and the system context; and
generating a runtime model from the business pattern and management integration table, wherein the generating supplements the business pattern with management application patterns selected using the management integration table, additive patterns required to achieve an objective beyond the business pattern and the management application patterns, and bridge patterns necessary to bridge two or more patterns in order to generate the runtime model.

8. The computer program of claim 7, wherein the business pattern is selected from a database of available business patterns.

9. The computer program of claim 7, wherein the plurality of cells within the management integration table are rated based on a relative security importance.

10. The computer program of claim 7, further comprising a system for generating a product mapping.

11. The computer program of claim 7, wherein the management application patterns provide patterns of objects and flows related to management processes.

12. The computer program of claim 7, wherein the additive and bridge patterns comprises management integration patterns that provide patterns of actions and augmented flows that integrate business processes and management processes with a set of defined system contexts.

13. A method for generating an information technology runtime model, comprising:
selecting, on at least one computing device, a business pattern;
providing, on the at least one computing device, a management integration table for the business pattern, the management integration table including a first axis including a plurality of management application pattern types including provision, control, monitor, enforce, and protect, and a second axis including a plurality of system contexts including business process, information technology, data, and security, wherein the management integration table includes a plurality of cells, each cell representing at least one management application pattern for a corresponding combination of the management application pattern type and the system context; and
generating, on the at least one computing device, a runtime model from the business pattern and management integration table, wherein the generating supplements the business pattern with management application patterns selected using the management integration table, additive patterns required to achieve an objective beyond the business pattern and the management application patterns, and bridge patterns necessary to bridge two or more patterns in order to generate the runtime model.

14. The method of claim 13, wherein the business pattern is selected from a database of available business patterns.

15. The method of claim 13, wherein the plurality of cells within the management integration table are rated based on a relative security importance.

16. The method of claim 13, further comprising the step of generating a product mapping.

17. The method of claim 13, wherein the management application patterns provide patterns of objects and flows related to management processes.

18. The method of claim 13, wherein the additive and bridge patterns comprise management integration patterns that provide patterns of actions and augmented flows that integrate business processes and management processes with a set of defined system contexts.

* * * * *